US012716544B2

(12) United States Patent
Lau et al.

(10) Patent No.: US 12,716,544 B2
(45) Date of Patent: Aug. 25, 2026

(54) TILT HEAD FOR HIGH LOAD DISPLAY SUPPORT SYSTEM

(71) Applicant: COLEBROOK BOSSON & SAUNDERS (PRODUCTS) LIMITED, London (GB)

(72) Inventors: Alex Lau, London (GB); Kruno Knezic, London (GB)

(73) Assignee: Colebrook Bosson & Saunders (Products) Limited, London (GB)

( * ) Notice: Subject to any disclaimer, the term of this patent is extended or adjusted under 35 U.S.C. 154(b) by 0 days.

(21) Appl. No.: 18/606,659

(22) Filed: Mar. 15, 2024

(65) Prior Publication Data

US 2024/0218958 A1 Jul. 4, 2024

Related U.S. Application Data

(63) Continuation of application No. 17/742,953, filed on May 12, 2022, now Pat. No. 11,933,450.

(60) Provisional application No. 63/187,700, filed on May 12, 2021.

(51) Int. Cl.

*F16M 11/10* (2006.01)
*F16M 11/08* (2006.01)
*F16M 11/20* (2006.01)
*F21V 21/26* (2006.01)

(52) U.S. Cl.

CPC ............ *F16M 11/10* (2013.01); *F16M 11/08* (2013.01); *F16M 11/2042* (2013.01); *F16M 11/2085* (2013.01); *F21V 21/26* (2013.01); *F16M 2200/021* (2013.01); *F16M 2200/041* (2013.01);

(Continued)

(58) Field of Classification Search

CPC .... F16M 11/08; F16M 11/10; F16M 11/2085; F16M 2200/06

See application file for complete search history.

(56) References Cited

U.S. PATENT DOCUMENTS

| | | |
|---|---|---|
| 2,022,366 A | 11/1935 | Boecking |
| 4,669,694 A | 6/1987 | Malick |
| 5,139,223 A | 8/1992 | Sedighzadeh |

(Continued)

FOREIGN PATENT DOCUMENTS

| | | |
|---|---|---|
| JP | H1201529 A | 8/1989 |
| JP | 2013534644 A | 9/2013 |

(Continued)

OTHER PUBLICATIONS

International Search Report with Written Opinion for related Application No. PCT/GB2022/051213 dated Aug. 8, 2022 (9 Pages).

(Continued)

*Primary Examiner* — Minh Q Phan

(74) *Attorney, Agent, or Firm* — Michael Best & Friedrich LLP

(57) ABSTRACT

A support system for a display device includes a first arm configured to extend from a support surface. A second arm is rotatably connected to the first arm. The second arm has a range of movement relative to the first arm. A ring housing is rotatably connected to the second arm. A tilt ring is moveably connected to the ring housing and configured to connect to a display. An adjustment mechanism is configured to move the tilt ring relative to the ring housing to modify the frictional engagement of the tilt ring and the ring housing.

17 Claims, 13 Drawing Sheets

(52) U.S. Cl.
CPC ... *F16M 2200/06* (2013.01); *F16M 2200/063* (2013.01)

(56) References Cited

U.S. PATENT DOCUMENTS

| | | | |
|---|---|---|---|
| 6,510,049 | B2 | 1/2003 | Rosen |
| 7,152,836 | B2 | 12/2006 | Pfister et al. |
| 7,380,760 | B2 | 6/2008 | Dittmer |
| 7,690,611 | B2 | 4/2010 | Asamarai et al. |
| 7,866,618 | B2 | 1/2011 | Grabania et al. |
| 7,954,780 | B2 | 6/2011 | Dittmer |
| 8,066,232 | B2 | 11/2011 | Wills et al. |
| 8,072,739 | B2 | 12/2011 | Dittmer |
| 8,142,064 | B2 | 3/2012 | Baek et al. |
| 8,199,472 | B2 | 6/2012 | Shen et al. |
| 8,201,791 | B2 | 6/2012 | Zhang et al. |
| 8,251,325 | B2 | 8/2012 | Molter |
| 8,746,635 | B2 | 6/2014 | Kim et al. |
| 9,074,721 | B2 | 7/2015 | Lau et al. |
| 9,279,536 | B2 | 3/2016 | Dittmer et al. |
| 9,316,346 | B2 | 4/2016 | Lau et al. |
| 9,572,269 | B2 | 2/2017 | Lau et al. |
| 10,344,911 | B2 | 7/2019 | Mills |
| 11,950,668 | B2 | 4/2024 | Lau |
| 11,950,698 | B2 | 4/2024 | Lau |
| 2008/0191109 | A1 | 8/2008 | Liang |
| 2011/0303805 | A1* | 12/2011 | Lau ...................... F16M 13/022 248/125.8 |
| 2012/0138754 | A1 | 6/2012 | Lim |
| 2013/0161466 | A1 | 6/2013 | Lau et al. |
| 2013/0314890 | A1 | 11/2013 | Smith |
| 2018/0112820 | A1* | 4/2018 | Lau .................... F16M 11/2092 |
| 2019/0301670 | A1 | 10/2019 | Glickstein et al. |

FOREIGN PATENT DOCUMENTS

| | | | |
|---|---|---|---|
| WO | 2007137905 | A1 | 12/2007 |
| WO | 2012075190 | A2 | 6/2012 |
| WO | 2016128765 | A1 | 8/2016 |
| WO | 2020144660 | A1 | 7/2020 |
| WO | 2022238712 | A1 | 11/2022 |

OTHER PUBLICATIONS

Japanese Patent Office Notice of Reasons for Refusal for Application No. 2023-570042 dated Jun. 1, 2026 (10 pages including English machine translation).

* cited by examiner

TILT HEAD FOR HIGH LOAD DISPLAY SUPPORT SYSTEM

CROSS-REFERENCE TO RELATED APPLICATION(S)

This application is a continuation of U.S. patent application Ser. No. 17/742,953, filed May 12, 2022, which claim prior to U.S. Provisional Application No. 63/187,700, filed May 12, 2021, the disclosure of which are incorporated herein by reference in their entirety, and to which priority is claimed.

FIELD OF INVENTION

Various exemplary embodiments relate to a support system used to moveably support electronic displays such as monitors or TVs.

BACKGROUND

Modern screen-based display devices are typically flat-screen displays mounted on elevated support devices. Certain support devices utilize a moveable support arm which can then be secured to a surface such that the display is held above or in front of the surface. The display can be connected to a moveably head so that the orientation of the display relative to the arm can be adjusted. For example, the display can be tilted and rotated relative to the support arm. Typical display support devices have a weight limit in a range sufficient for standard displays, for example in the range of 0 to 9 kg, which may be sufficient for monitors up to 27 inches. An example of such a support system is shown in U.S. Pat. No. 9,316,346, the disclosure of which is incorporated herein by reference in its entirety.

If a larger display outside of the standard weight range is used with a standard display head, the load of the display can overcome the retention force of the head. This can result in the head being unable to support the display in a position desired by a user. Accordingly, larger displays are typically supported by static mounts, which limits the positioning and flexibility provided by moveable supports.

SUMMARY

In certain configurations, a support system for a display device includes a first arm configured to extend from a support surface. A second arm is rotatably connected to the first arm. The second arm has a range of movement relative to the first arm. A ring housing is rotatably connected to the second arm. A tilt ring is moveably connected to the ring housing and configured to connect to a display. The tilt ring has a diamond-shaped configuration that forms a frictional engagement with the ring housing. An adjustment mechanism is configured to move the tilt ring relative to the ring housing to modify the frictional engagement of the tilt ring and the ring housing.

In certain configurations the tilt ring has a truncated outer edge.

In certain configurations the adjustment mechanism pivots the tilt ring relative to the ring housing.

In certain configurations a cradle is positioned in the ring housing and the tilt ring is slidably connected to the cradle.

In certain configurations the cradle includes a body defining a V-shaped groove to receive the diamond-shaped tilt ring.

In certain configurations the adjustment mechanism is configured to pivot the cradle relative to the ring housing.

In certain configurations the adjustment mechanism includes a rotating member and a transverse pin.

In certain configurations, a support system for a display device includes a first arm configured to extend from a support surface. A second arm is rotatably connected to the first arm. The second arm having a range of movement relative to the first arm. A ring housing is rotatably connected to the second arm. A cradle is moveably connected to the ring housing. A tilt ring is moveably connected to the cradle and the ring housing and configured to connect to a display. The tilt ring has a frictional engagement with the ring housing. An adjustment mechanism is configured to pivot the cradle relative to the ring housing. Movement of the cradle relative to the ring housing modifies the frictional engagement of the tilt ring and the ring housing.

In certain configurations the adjustment mechanism pivots the cradle from a rear position relative to the housing and a forward position relative to the housing.

In certain configurations, when the cradle is in the forward position, the cradle is freely moveable to the rear position without adjustment of the adjustment mechanism.

In certain configurations the adjustment mechanism includes a rotating member and a transverse pin.

In certain configurations the ring housing has a first opening receiving the transverse pin and the cradle has a second opening receiving the transverse pin, and rotation of the rotating member causes translation of the transverse pin in the first opening.

In certain configurations the adjustment member is accessible to a user when a display is connected to the tilt ring.

In certain configurations the tilt ring has a diamond-shaped configuration.

In certain configurations the adjustment member includes a head configured to receive a tool.

In certain configurations the tilt ring includes a circular mount, and a VESA connector is rotatably connected to the mount.

In certain configurations, a support system for a display device includes a first arm configured to extend from a support surface. A second arm is rotatably connected to the first arm. The second arm has a range of movement relative to the first arm. A ring housing is rotatably connected to the second arm. The ring housing has an arcuate slot that defines a first travel path. A cradle is moveably connected to the ring housing. The cradle has a body defining an arcuate second travel path. A tilt ring is moveably connected to the cradle and the ring housing. The tilt ring has a frictional engagement with the ring housing. An adjustment mechanism is configured to pivot the cradle relative to the ring housing to move the second travel path relative to the first travel path.

In certain configurations movement of the first path relative to the second path adjusts the frictional engagement between the tilt ring and the tilt housing.

In certain configurations the adjustment mechanism pivots the cradle relative to the ring housing.

In certain configurations the adjustment mechanism includes a rotating member and a transverse pin, and wherein the ring housing has a first opening receiving the transverse pin and the cradle has a second opening receiving the transverse pin, and rotation of the rotating member causes translation of the transverse pin in the first opening.

In certain configurations the tilt ring has a diamond-shaped configuration.

In certain configurations, a support system for a display device includes a first arm configured to extend from a support surface. A second arm is rotatably connected to the first arm. The second arm has a range of movement relative to the first arm. A tilt mechanism is rotatably connected to the second arm. The tilt mechanism includes a ring housing and a tilt ring moveably connected to the ring housing. A connector is moveably connected to the tilt ring. The connector is configured to receive an adapter plate for mounting a display.

In certain configurations, the tilt ring includes a circular mount and the connector includes a circular opening for receiving the mount to rotatably connect the connector to the mount.

In certain configurations, the mount includes a substantially annular channel and the connector includes a projection extending into the opening to mate with the annular channel.

In certain configurations, the connector has a first portion and a second portion spaced from the first portion by a gap, and wherein the gap is bridged by a fastener configured to move the first portion relative to the second portion.

In certain configurations, the connector is configured to slidably engage a VESA plate.

In certain configurations, the connector has a trapezoidal configuration.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Certain exemplary configurations of a display support system are directed to a moveable arm support having a tilt head for the display. The tilt head is configured to provide sufficient retention force to hold a display at a desired position. In certain configurations the tilt head can allow a user to adjust the position of the display without having to make adjustments to the tilt head.

Figure 1:
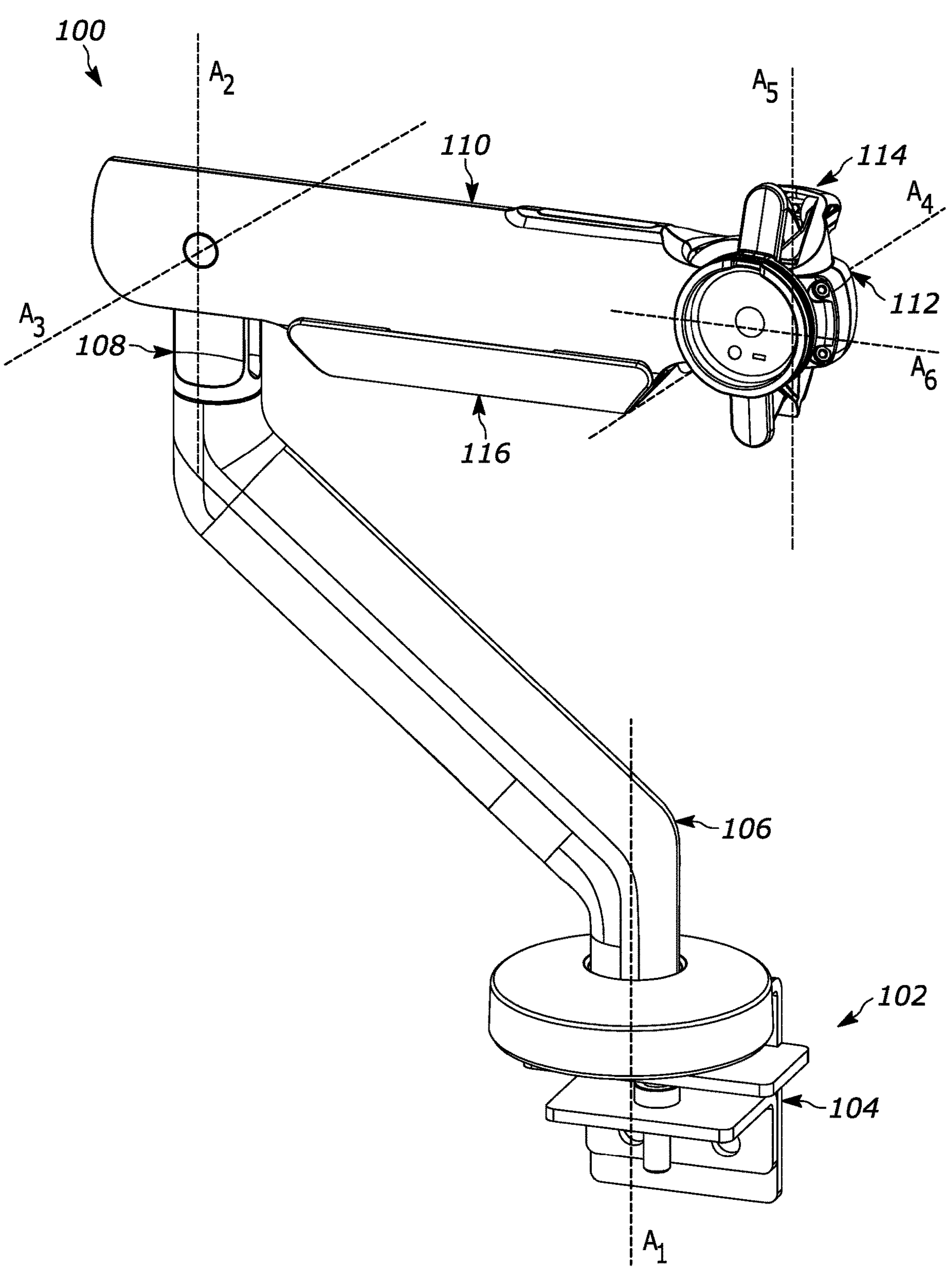
FIG. 1 is an isometric view of a support system for a display.

FIG. 1 shows an exemplary embodiment of a support system 100 for a display that includes a mounting portion 102. The mounting portion 102 is configured to secure the support system 100 to a support surface (not shown). The mounting portion 102 can include a clamp member 104 that can be connected to various surfaces or supports, such as desk, tables, walls, etc. as would be understood by one of ordinary skill in the art. A first arm 106 extends from the mounting portion 102. In certain configurations the first arm 106 is rotatably connected to the mounting portion. A mid joint 108 is rotatably connected to a distal portion of the first arm 106. A second arm 110 is rotatably connected to the mid joint 108. A head joint 112 is rotatably connected to the distal portion of the second arm 110. A tilt mechanism 114 is moveably connected to the head joint 112. A display mount (not shown) for example a VESA type display mount can be connected to the tilt mechanism 114 to receive a display or a display can be directly connected to the tilt mechanism. Each of the first arm 106, mid joint 108, second arm 110, head joint 112, and tilt mechanism 114 can include single or multi piece housings components, for example where first and second pieces are connected to one another. Other housing pieces can be connected as needed. One or more cable management devices 116 can be positioned on one or more of the arms to organize and retain cables running to the display. The first arm 106, mid joint 108, second arm 110, head joint 112, and tilt mechanism 114 make up an exemplary embodiment of a support structure, although other variations of support structures may also be used.

As best shown in FIG. 1, the first arm 106 can rotate relative to the support or surface about a first vertical axis A1. The mid joint 108 can rotate relative to the first arm 106 about a second axis A2. The second arm 110 can rotate relative to the mid joint 108 about a third axis A3. The head joint 112 can rotate relative to the second arm 110 about a fourth axis A4. The tilt mechanism 114 can rotate relative to the head joint 112 about a fifth axis A5 and about a sixth axis A6. In the illustrated embodiment, the first axis A1 and the second axis A2 are vertical axes. The third axis A3 and the fourth axis A4 are horizontal axes. The fifth axis A5 is a vertical axis and the sixth axis A6 is a horizontal axis. In an exemplary embodiment the sixth axis A6 is a virtual axis spaced from tilt mechanism 114 to extend either through the display mount or a portion of a display connected thereto.

In certain configurations, a direct link (not shown) has a first portion pivotally connected to the mid joint 108 and a second portion pivotally connected to the head joint 112. The direct link can extend through the housing, passing through the second spring casing and the second spring. During movement of the second arm from a raised position to a lowered position, the direct link caused rotation of the head joint about the horizontal axis A4 so that an attached display will maintain a relative position to the support surface during rotation of the second arm 110.

Figure 2:
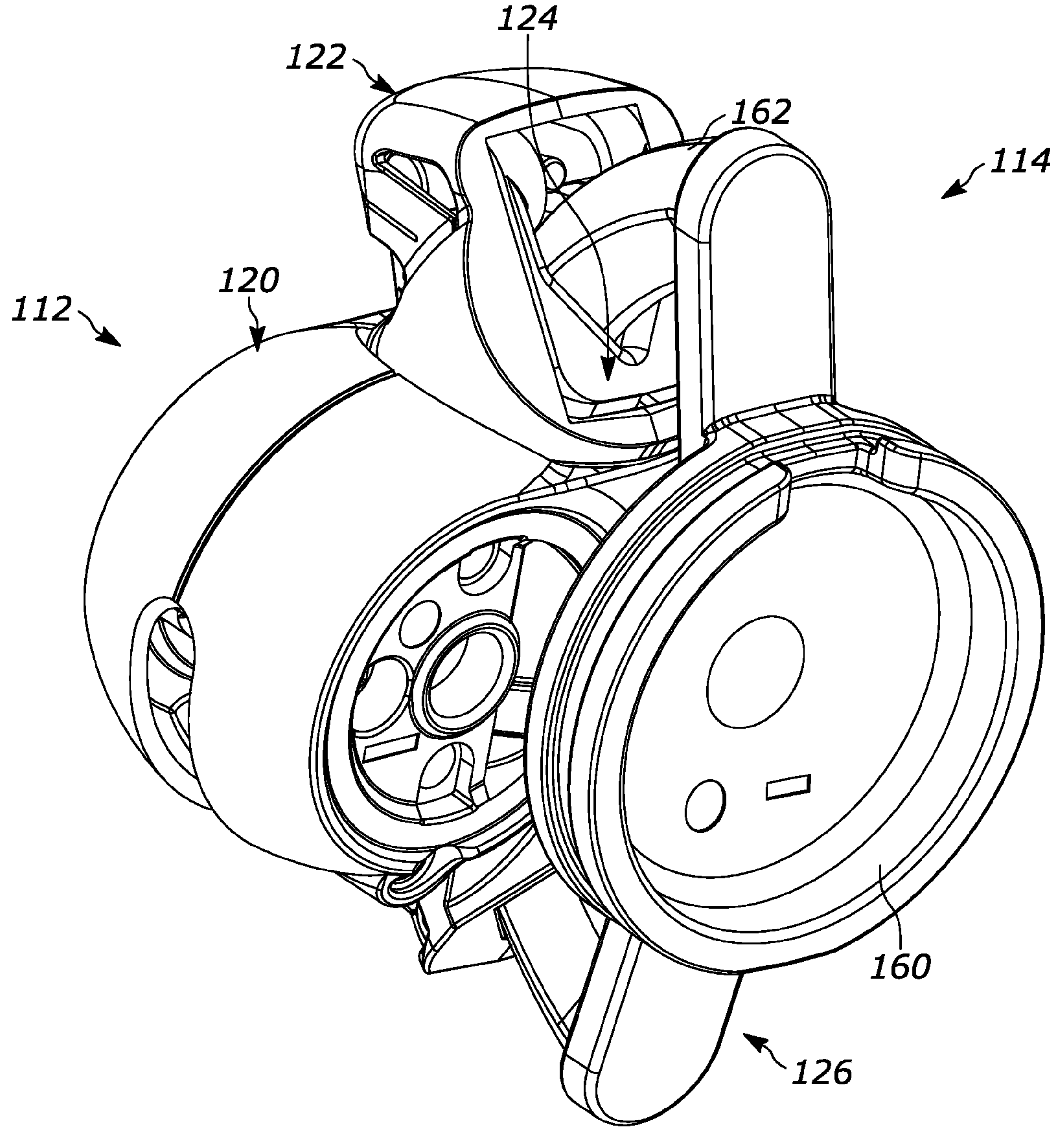
FIG. 2 is an isometric view of the head joint, ring housing, and tilt ring of the support system.
Figure 3:
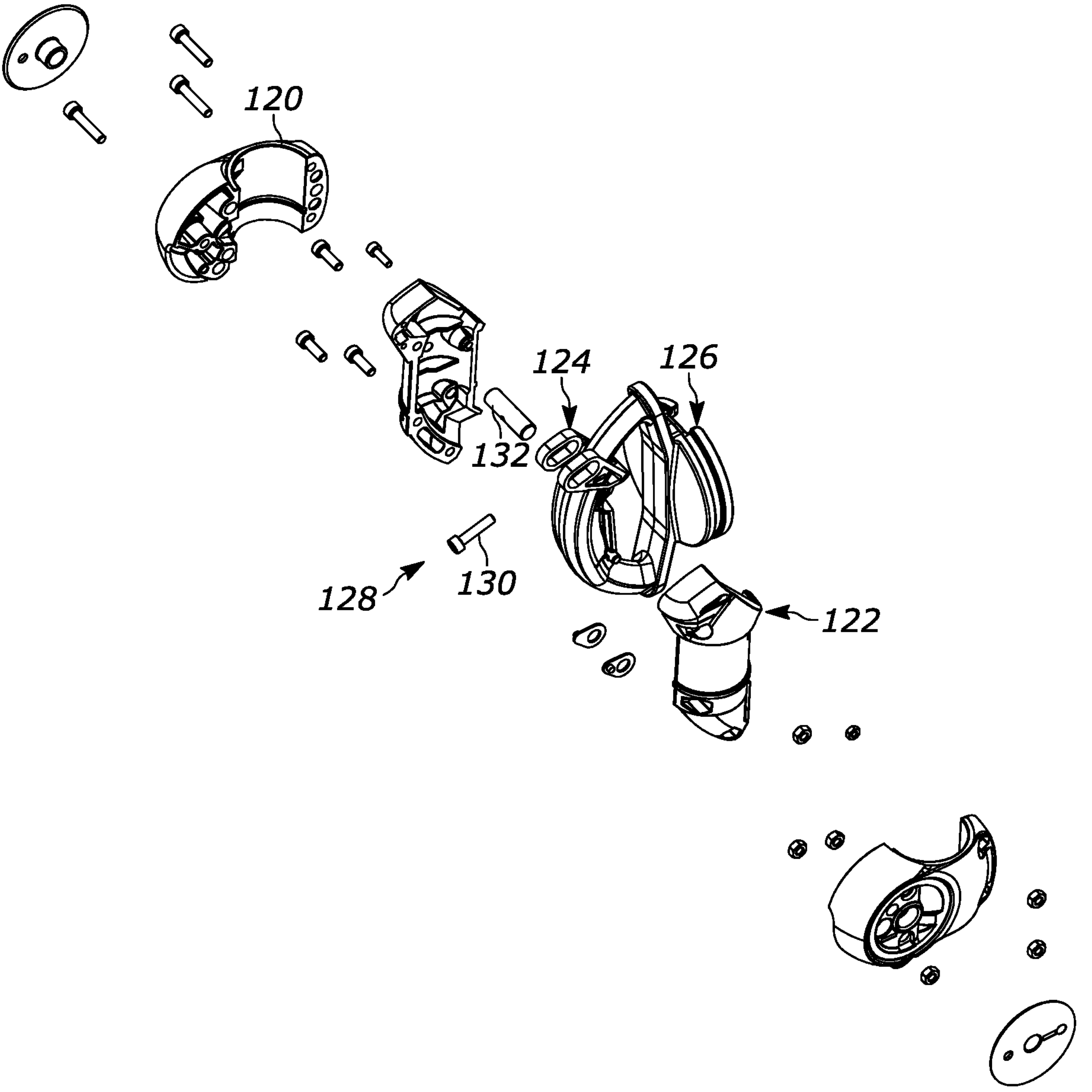
FIG. 3 is a partially exploded view of the components of FIG. 2.

FIGS. 2 and 3 show the components of the head joint 112 and the tilt mechanism 114. The head joint 112 includes one or more joint body members 120. The tilt mechanism 114 is rotatably connected to the head joint 112. The tilt mechanism 114 includes a ring housing 122, a ring cradle 124, and a tilt ring 126. The ring housing 122 can include a first ring housing member and a second ring housing member. The ring cradle 124 is moveably connected to the ring housing 122. The tilt ring 126 is moveably connected to the ring cradle 124 and the ring housing 122. An adjustment mechanism 128 is connected to the ring housing and the cradle. In certain configurations, the adjustment mechanism 128 includes a rotating member 130 and a transverse pin 132.

In the illustrated embodiment the head joint 112 and the ring housing 124 are formed using a pair of body members connected to each other through one or more fasteners. Other configurations can utilize greater or fewer body members as needed.

Figure 4:
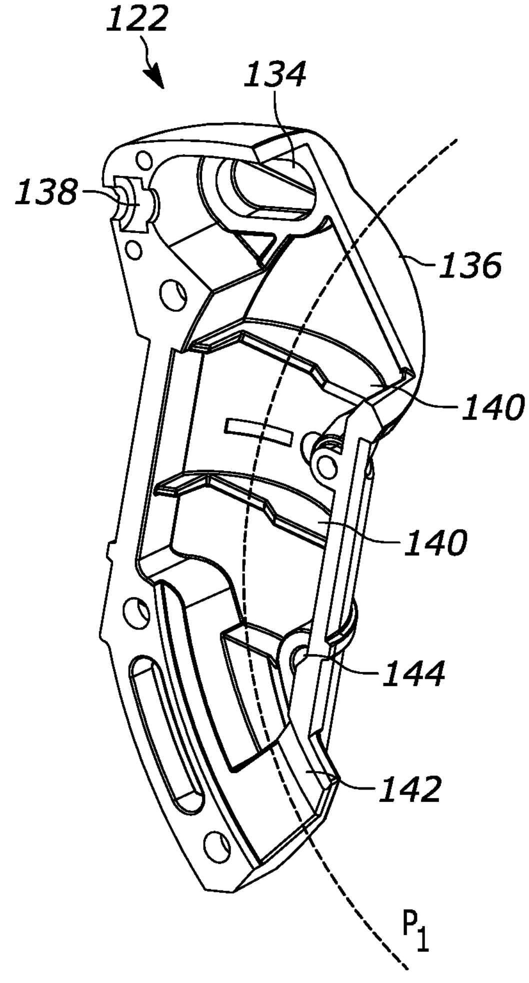
FIG. 4 is a side view of the ring housing member.

FIG. 4 shows an exemplary embodiment of the first ring housing member 122, with the second ring housing member being a mirror image thereof. In certain configurations, the tilt ring 126 is slidably received in the ring hosing 122 and the cradle 124 is pivotally connected to the ring housing 122. The ring housing 122 is rotatably received in the head joint 112.

In an upper portion of the ring housing 122, a side opening 134 defines a slot or groove to moveably connect the transverse pin 132 of the adjustment mechanism 128 to the ring housing member. The opening 134 can be a through hole or a blind hole. The length of the opening 134 can define the travel distance of the adjustment mechanism 128. In certain configurations, the side opening 134 extends along an axis that is at an oblique angle relative to the second arm 110 in a neutral position or substantially perpendicular to the central axis of the mid joint 108. The upper portion of the first ring housing member also includes an angled outer surface 136 defining an opening through which the cradle 124 and the tilt ring 126 can extend as the cradle 124 and tilt ring 126 are moved relative to the ring housing 122.

A rear chamber 138 is provided adjacent to the side opening 134 to receive the rotating member 130 of the adjustment mechanism 128. The chamber 138 is configured to capture at least a portion of the rotating member 130 to limit translation of the rotating member 130 relative to the ring housing 122. In certain configurations, the rotating member 130 includes a head, and the chamber 138 can be configured to limit translation of the head in a forward and rear direction. The head can be configured to be accessed by a user through a rear opening so that a tool can be inserted into the head and used to rotate the rotating member 130. In other configurations, a portion of the rotating member 130 may extend outside of the chamber and be engaged by a user directly without a tool.

The body of the ring housing 122 can include one or more side protrusions 140. Each of the side protrusions 140 includes a cutaway portion to receive the cradle 124. These protrusions 140 help restrain sideways movement of the cradle 124 to limit any bending or twisting during operation. The lower portion of the ring housing includes an arcuate slot 142 having a curvature that at least partially defines a first travel path P1. A lower opening is provided through which a bottom of the tilt ring 126 extends. A lower side opening 144 acts as a pivoting connection point for the cradle 124.

Figure 5:
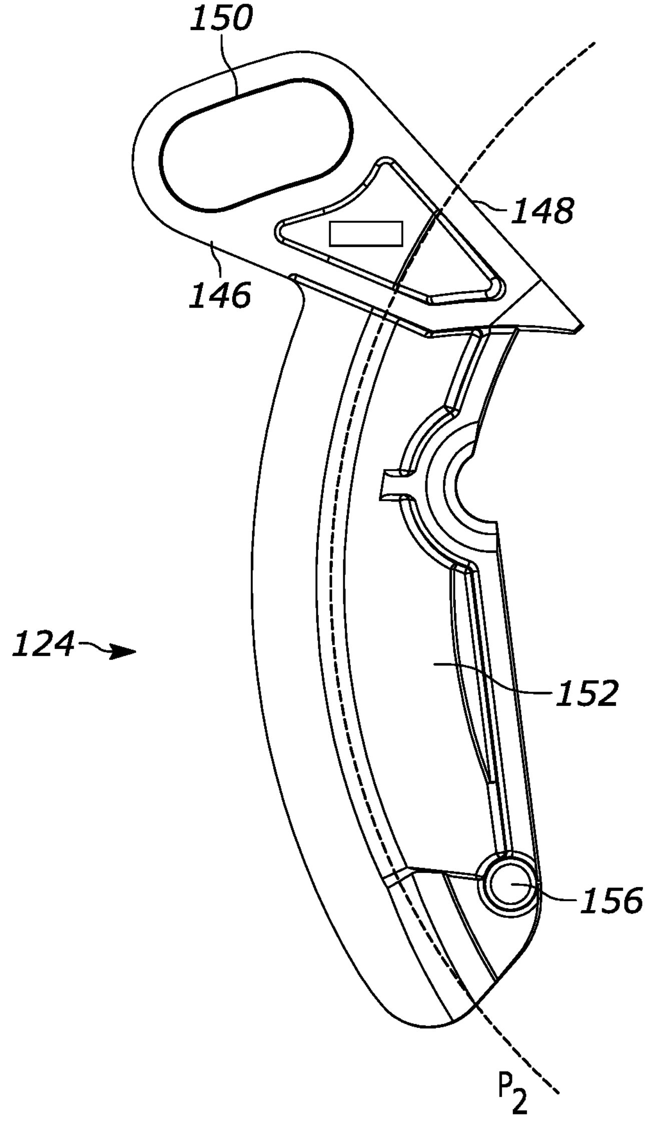
FIG. 5 is a side view of the cradle.
Figure 6:
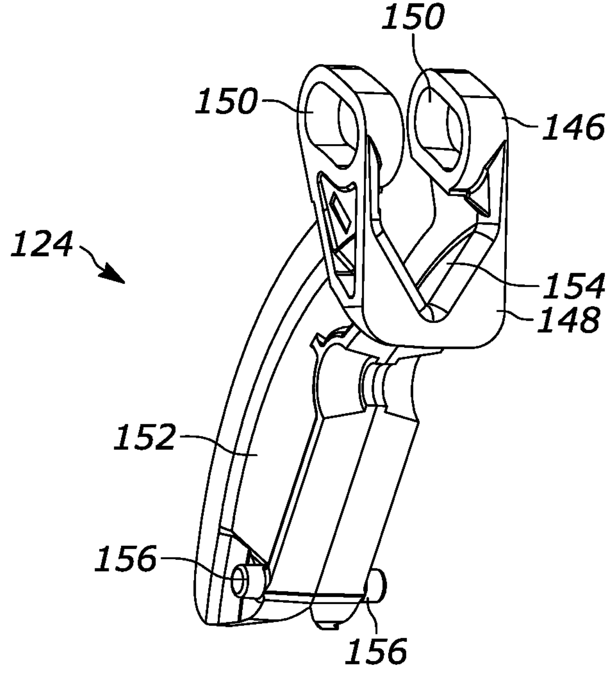
FIG. 6 is front isometric view of the cradle.

FIGS. 5 and 6 show an exemplary embodiment of the cradle 124. In certain configurations the cradle 124 has a head 146 with an angled front surface 148 and a pair of openings 150 that receive the transverse pin 132 of the adjustment mechanism 128. When connected to the ring housing 122, the openings 150 can be substantially aligned with the openings 134 in the ring housing 122.

The body 152 of the cradle can define an arcuate, substantially V-shaped groove 154 for receiving the tilt ring 126. The V-shaped groove 154 defines an arcuate second travel path P2. A protrusion 156 can extend from each side of the body 152 to pivotally connect the cradle 124 to the ring housing 122.

Figure 7:
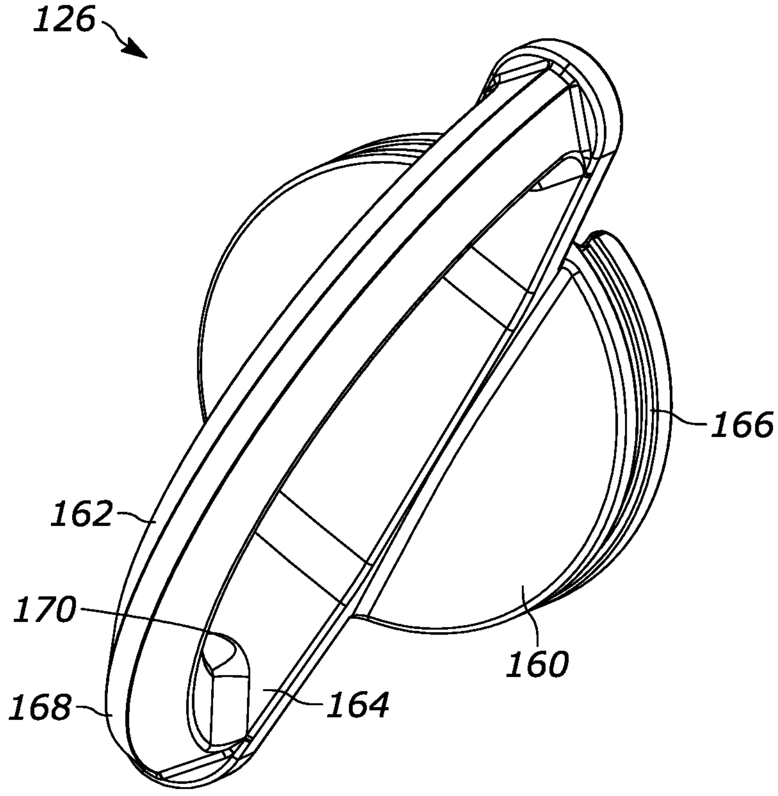
FIG. 7 is a rear isometric view of the tilt ring.

FIG. 7 shows an exemplary embodiment of the tilt ring 126. The tilt ring 126 can include a mount 160 configured to connect to a display and a ring member 162 that is received in the ring housing 122. An extension 164 extends between the mount 160 and the ring 162. The mount 160 can have a disc configuration with a groove 166 extending substantially around an outer circumference of the disc. A mounting plate can be connected to the mount 160, for example a VESA standard compatible mounting plate. In certain configurations a mounting plate can include a protrusion that engages the groove 166. In certain configurations, the mount 160 can be directly connected to a display.

The ring member 162 extends from the mount 160 to be slidably received in the ring housing 122. The ring 162 has a diamond-shaped configuration that extends along an arcuate path. The diamond-shaped configuration can include a truncated outer edge 168 and a truncated inner edge 170. When assembled, the diamond-shaped ring member 162 will form a frictional engagement with the ring housing 122 and the cradle 124. In certain configurations, other shapes can be used for the ring member 162, however, it has been found that the diamond-shape of the ring member 162 has an unexpected increased holding performance relative to other shapes.

Figure 8:
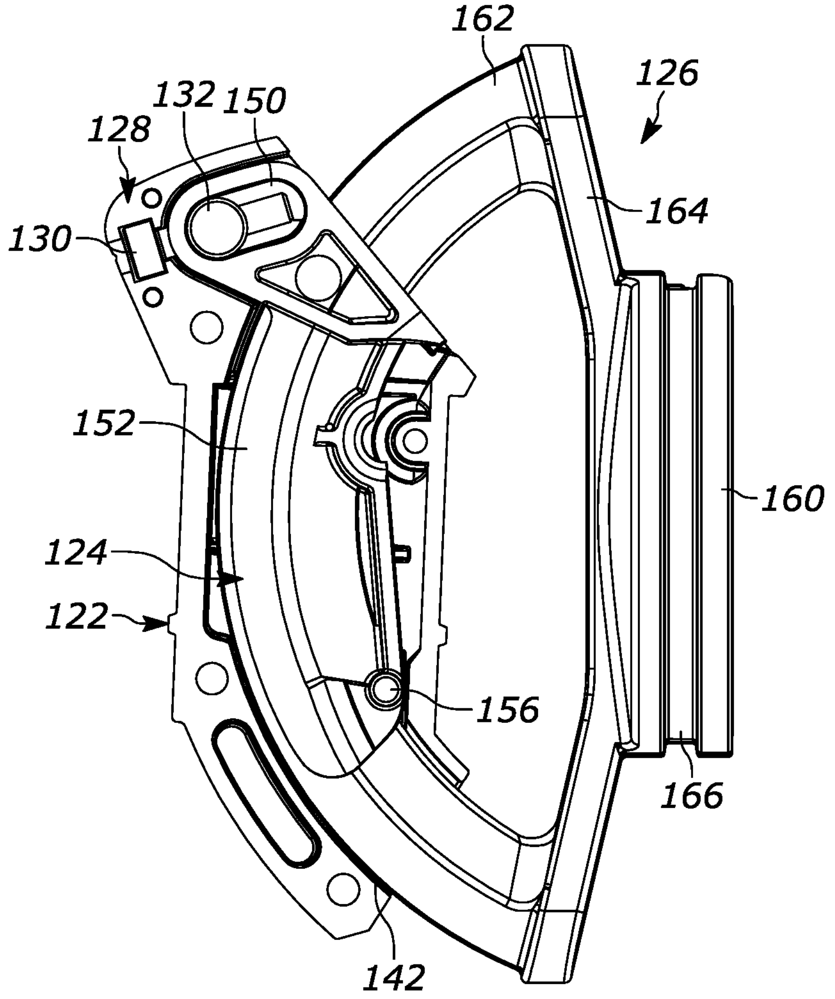
FIG. 8 is a side view of the assembled ring housing member, cradle, and tilt ring with the cradle and adjustment mechanism in a rear position.
Figure 9:
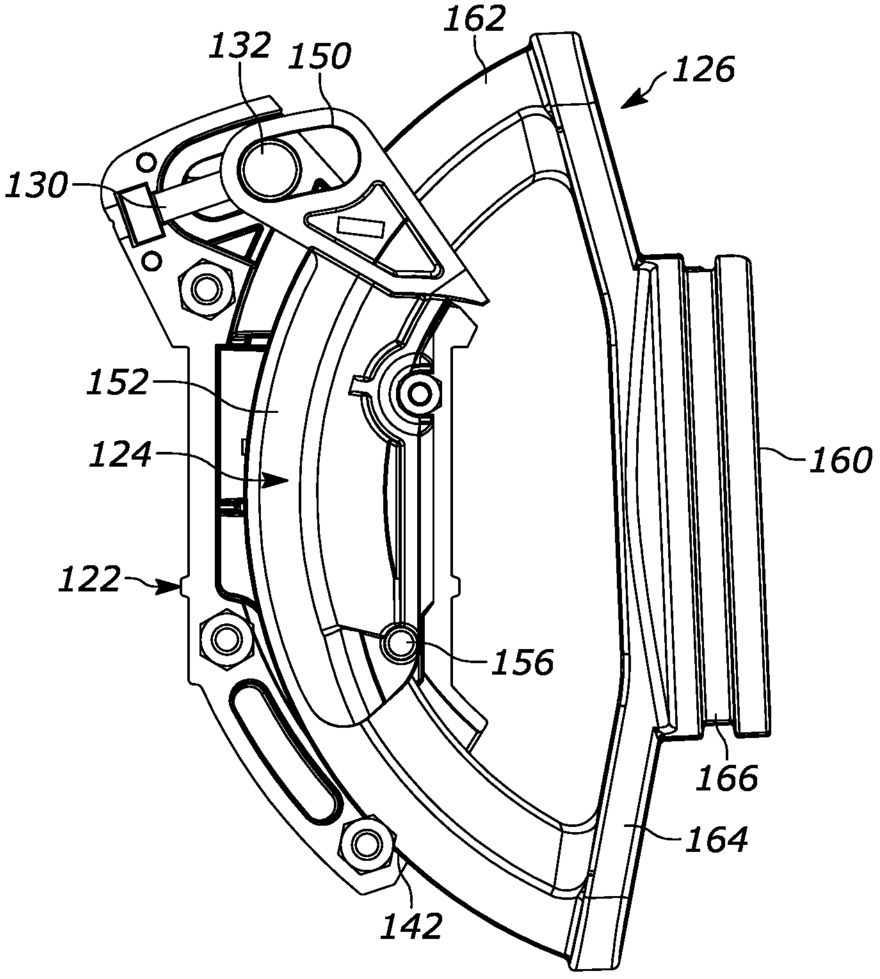
FIG. 9 is a side view of the assembled ring housing member, cradle, and tilt ring with the cradle and adjustment mechanism in a forward position.

FIGS. 8 and 9 show the tilt ring 126 assembled with the cradle 124, the ring housing 122, and the adjustment mechanism 128. When assembled, the ring 162 is slidably engaged with the ring housing 122 and the cradle 124. This engagement results in a resultant friction force between the ring 162 and the ring housing 122 and the ring 162 and the cradle 124. In certain configurations and orientations of these components, the friction force can be greatest where the outer surface of the ring 162 engages the lower arcuate portion 142 of the ring housing 122.

The adjustment mechanism 128 is configured to pivot the cradle 124 relative to the ring housing 122. In the illustrated embodiment, the cradle 124 is pivoted about the connection between the lower protrusions 156 of the cradle 124 and the ring housing 122. A user can rotate the rotating member 130, which can be threadably connected to the transverse pin 132. This rotation causes movement of the pin 132 in the openings 134 on the ring housing 122, in a forward or rearward direction. FIG. 8 shows the transverse pin 132 in a rear position and FIG. 9 shows the transverse pin 132 in a forward position.

The rotating member 130 can have a user interface that allows a user to rotate the rotating member 130 with a tool or by hand. For example, the rotating member 130 can have a head with a socket that receives a tool or it can have a head that includes a thumbscrew to allow for manual adjustment. In certain configurations the adjustment mechanism 128 is accessible to a user when a display is connected to the tilt ring 126. For example, the adjustment mechanism 128 is accessible from the top of the ring housing 122 or the rear of the ring housing 122 opposite the display.

As discussed herein, the ring housing 122 defines a first travel path P1 and the cradle 124 defines a second travel path P2. The first and second travel paths P1, P2 define the movement of the tilt ring 126. When the cradle 124 is pivoted to the rear position (FIG. 8) the first travel path P1 and the second travel path P2 are substantially aligned. This results in a minimal amount of friction between the ring 162 and the ring housing 122 and cradle 124. When the cradle 124 is pivoted to the forward position (FIG. 9), the second travel path P2 becomes offset from the first travel path P1. As the ring 162 pivots forward with the cradle 124 the misalignment between the two paths increases the frictional engagement between the ring 162, the ring housing 122, and the cradle 124. For example, the frictional engagement between the lower portion of the ring housing 122 and the ring 162 can be increased and the frictional engagement between the upper portion of the ring 162 and the cradle 124 can be increased. In certain configurations, the frictional engagement of a lower portion of the ring 162 can be greater than the frictional engagement of an upper portion of the ring 162.

As the transverse pin 162 is translated forward it travels along the opening 134 in the ring housing 122, causing pivoting movement of the cradle 124 relative to the ring housing 122. Without user engagement, the transverse pin 132 will typically be engaged with a rear wall of the openings 150 formed in the cradle 124 (as shown in FIG. 9), especially when the weight of an attached display causes a clockwise moment load on the cradle 124. The cradle 124, however, remains freely moveable relative to the transverse pin 132 through the range of motion afforded by the openings 150 in the cradle 124. In this way, a user can tilt the cradle 124 in a rearward direction to decrease the friction force between the tilt ring 126 and the ring housing 122 without adjusting the adjustment mechanism 128. This allows a user to reduce the force needed to adjust the tilt of an attached display simply by moving the display. The display can be release at a desired position to increase the frictional engagement and retain the position of the display.

Figure 10:
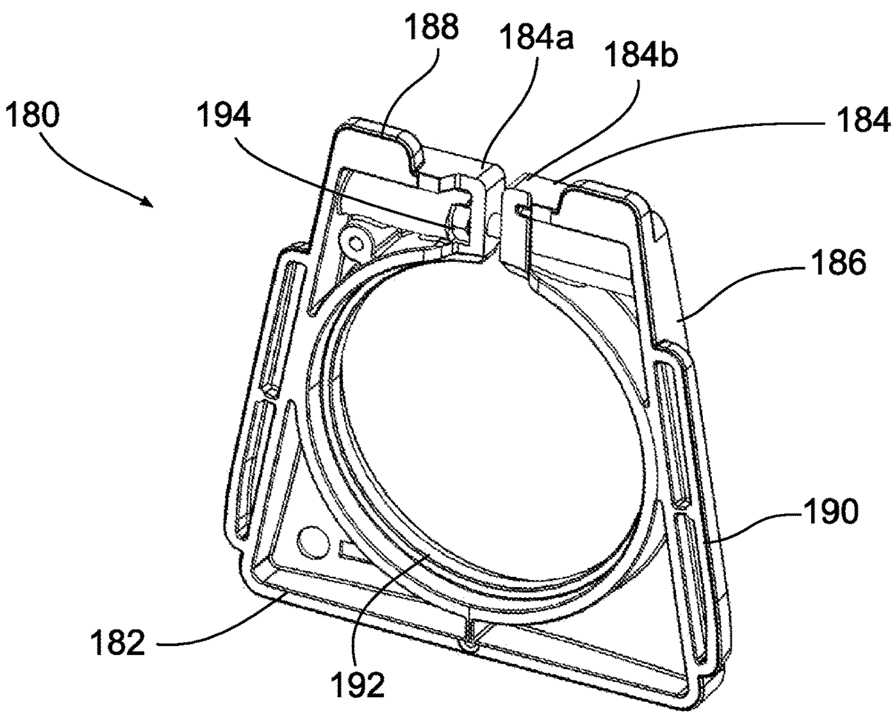
FIG. 10 is a front isometric view of a connector.
Figure 11:
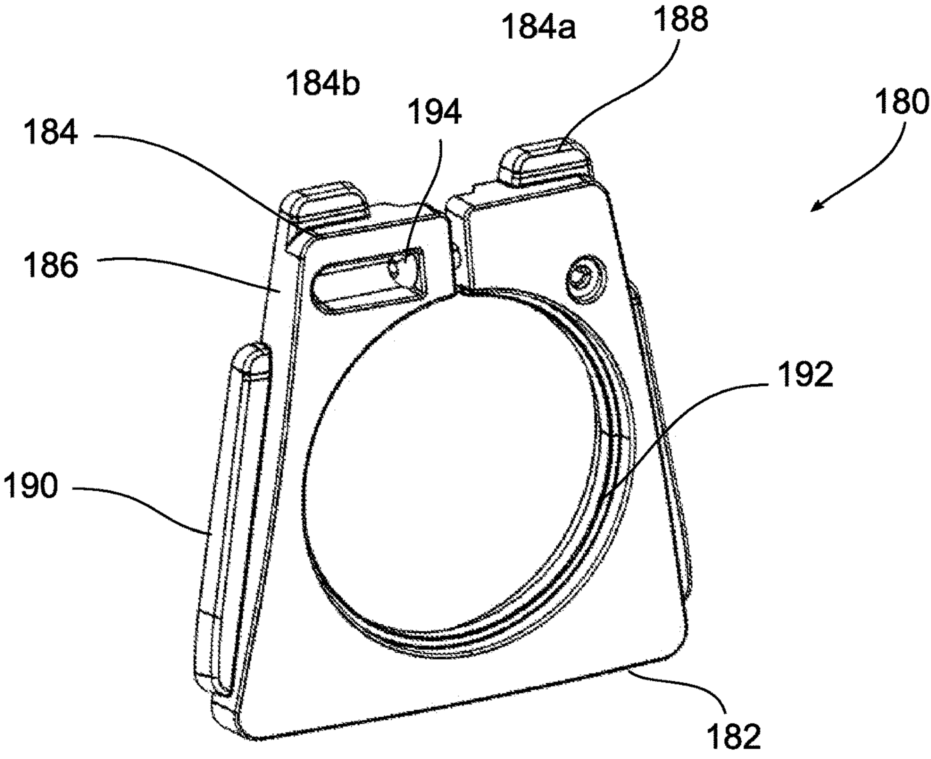
FIG. 11 is a rear isometric view of a connector.
Figure 12:
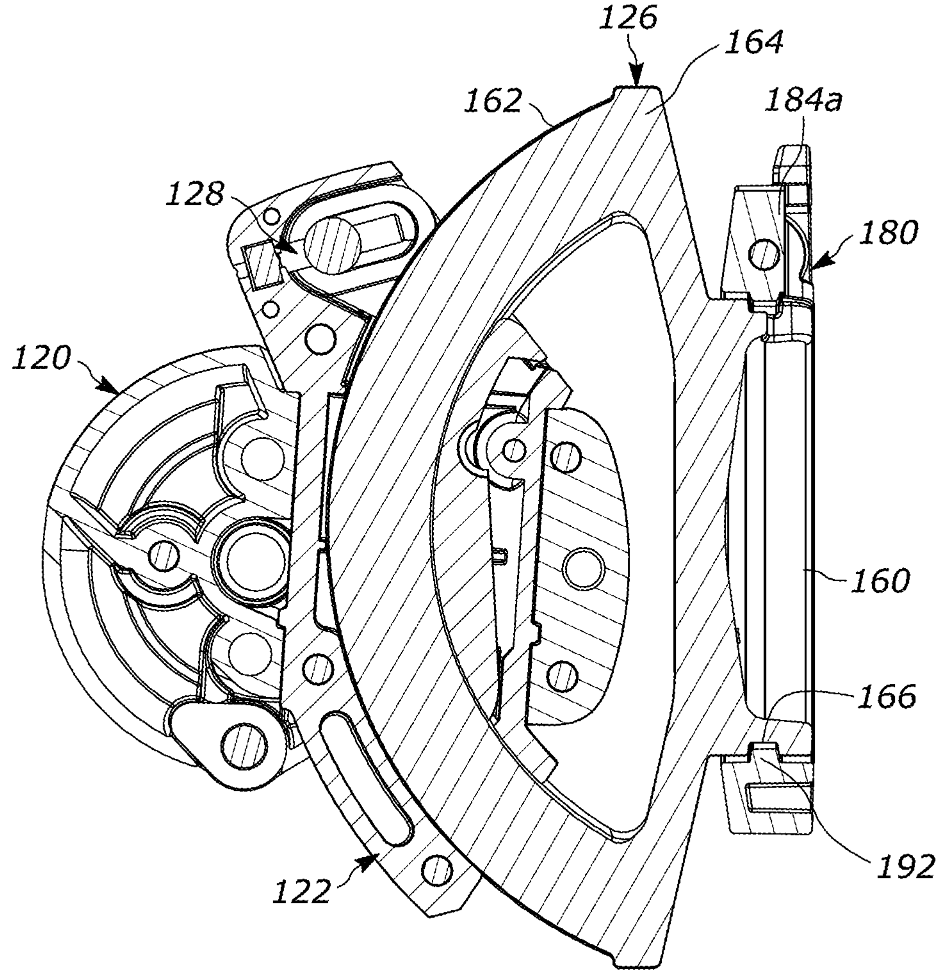
FIG. 12 is a sectional view of the connector connected to the tilt ring.

FIGS. 10-12 show an exemplary embodiment of a VESA connector 180 that is configured to connect to the mount 160 and the slidably receive a VESA plate. In certain configurations, the VESA connector has a trapezoidal configuration with a base 182, a top 184, and a pair of angled sides 186. One or more top tabs 188 extend from the top and one or more side tabs 190 extend from the sides. The top and side tabs 188, 190 are configured to mate with accommodating recesses on an associated mounting plate, such as a VESA standard mounting plate. The trapezoidal configuration can allow the connector 180 to wedge into engagement with the mounting plate with the weight of the display increasing such engagement.

The VESA connector 180 can be rotatably connected to the mount 160. In one embodiment, the VESA connector 180 can define a central opening, with a projection 192 extending from an inner surface into the central opening. As best shown in FIG. 12, the projection 192 mates with the groove 166 in the mount 160. This allows the VESA connector 180 to rotate around the mount 160.

The top 184 of the VESA connector 180 can have a split configuration with a first portion 184*a* and a second portion 184*b* that are bridged by a fastener 194. In certain configurations the fastener 194 can include a head and a captive nut. The head can be accessed by a user to adjust the fastener 194 and adjust the position of the first and second top portions. This allows a user to increase or decrease the frictional engagement between the VESA connector 180 and the mount 160. The frictional engagement of the VESA connector 180 with the mount 160 can be adjusted by a user so that a connected display can be rotated but maintain its position to the mount 160.

Figure 13:
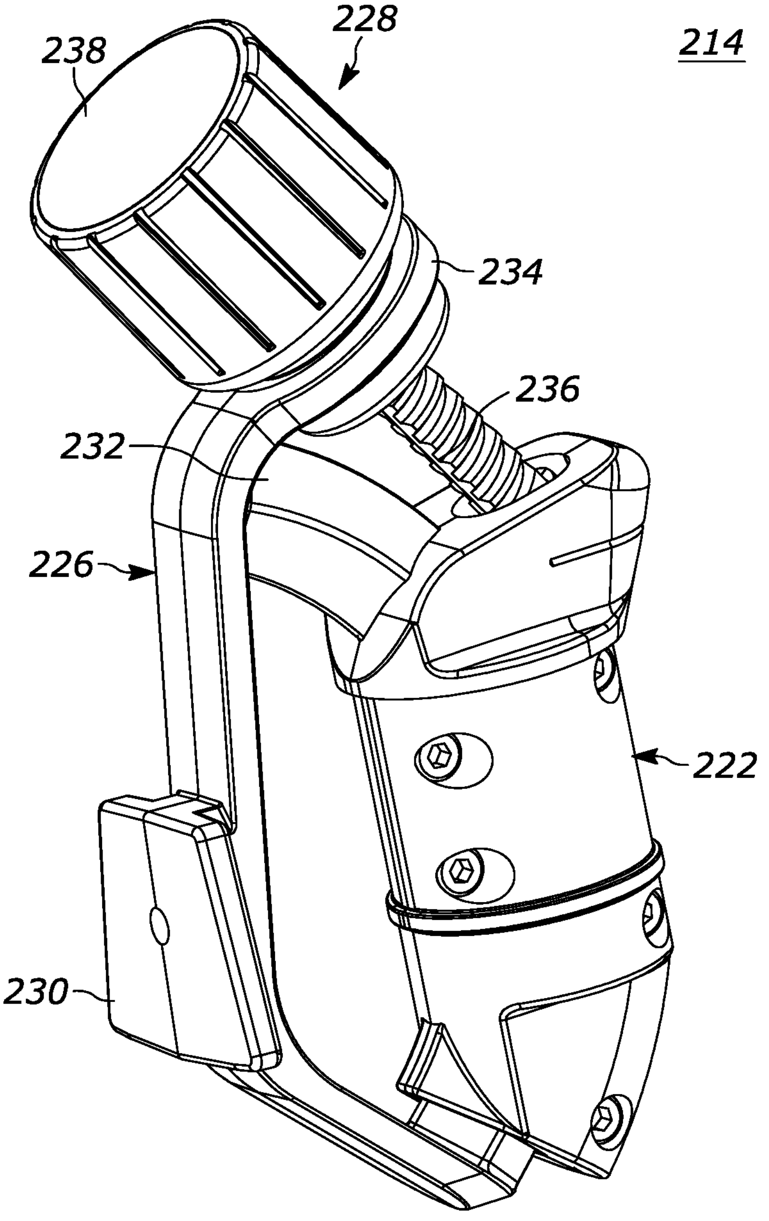
FIG. 13 is an isometric view of another embodiment of the tilt mechanism.
Figure 14:
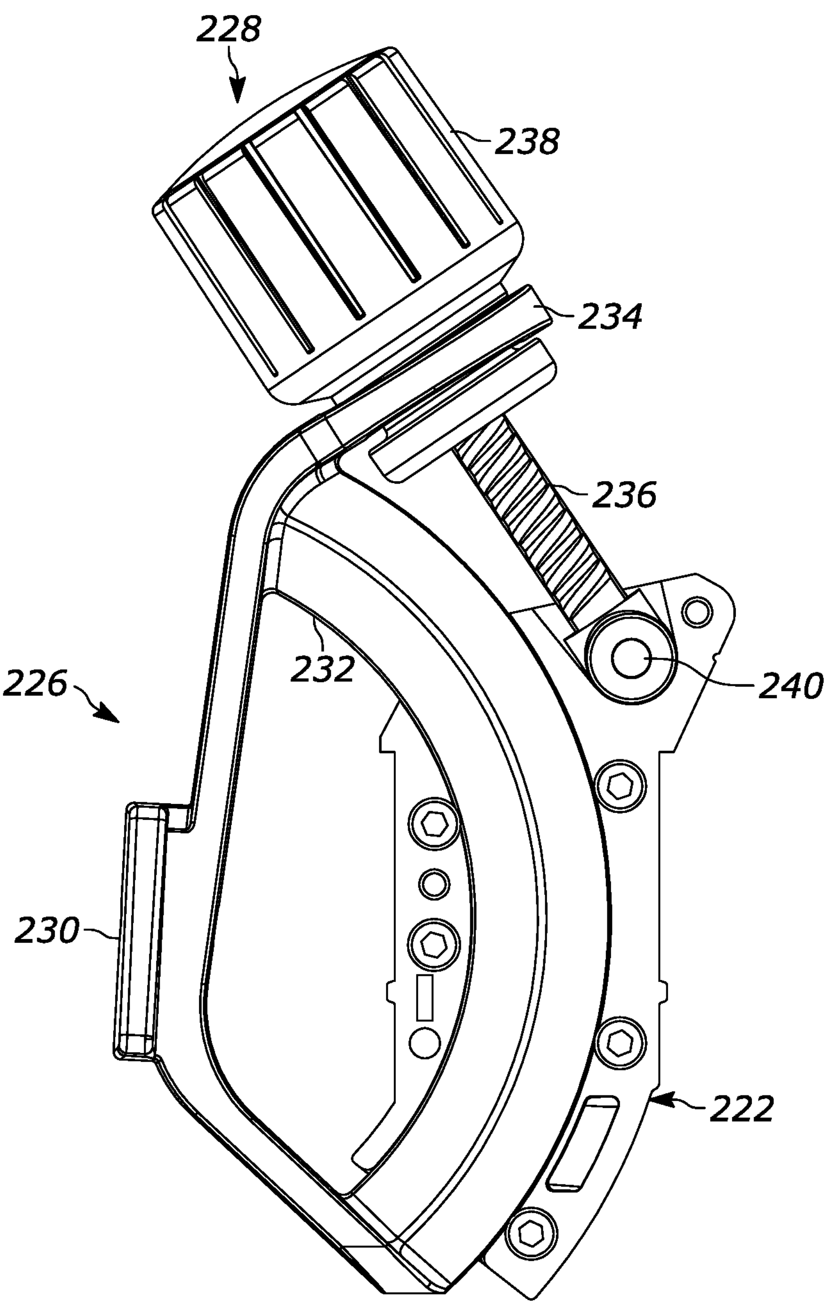
FIG. 14 is a side view of FIG. 10.

FIGS. 13 and 14 show an alternative embodiment of the title mechanism 214 having a ring housing 222, tilt ring 226, and adjustment mechanism 228. In this embodiment, the tilt mechanism 214 does not utilize a moveable cradle. Instead the position of the tilt ring 226 is adjusted and retained in a static manner directly by the adjustment mechanism 228.

The tilt ring 226 includes a mount 230, a ring member 232, and an upper projection 234 extending above the ring 232. The upper projection 234 includes an opening that receives the adjustment mechanism 228.

The adjustment mechanism 228 includes a threaded fastener 236 rotatably connected to the ring housing 222 at a pivot point 240 having an axis extending perpendicular to the axial direction of the fastener 236. A thumbscrew 238 is rotatably connected to the fastener 236. The thumbscrew 238 can include a groove that can receive the upper projection 234 of the tilt ring 226.

Rotation of the thumbscrew 238 causes it to travel in the axial direction of the fastener 236. This movement causes the tilt ring 226 to slide in the ring housing 222, moving between an upper and lower position. This adjustment mechanism 228 can retain the tilt position of the tilt ring 226 when load weights are higher than can be accommodated by a friction engagement.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Unless specified or limited otherwise, the terms "mounted," "connected," "supported," and "coupled" and variations thereof are used broadly and encompass both direct and indirect mountings, connections, supports, and couplings.

What is claimed:

1. A support system for a display device comprising:

a first arm configured to extend from a support surface;

a second arm rotatably connected to the first arm, the second arm having a range of movement relative to the first arm;

a head joint rotatably connected to the second arm, the head joint including a joint body member; and a tilt mechanism disposed at least partially within the head joint, the tilt mechanism including a ring housing rotatably received within the head joint, and a tilt ring received within the head joint and including a mount configured to connect to a display, the tilt ring extending into an opening in the ring housing and slidable relative to the ring housing to adjust a tilt of the display, wherein the tilt ring and the ring housing are configured for co-rotation about a first vertical axis (A5) and wherein the tilt ring and the ring housing are inhibited from rotating relative to each other about the first vertical axis (A5);

wherein the tilt mechanism is rotatable relative to the head joint about the first vertical axis (A5) and a second horizontal axis (A6); and wherein the tilt mechanism is rotatable about the first vertical axis (A5) via rotation of the ring housing relative to the head joint.

2. The support system of claim 1, wherein the head joint is rotatable relative to the second arm about a first horizontal axis (A4).

3. The support system of claim 1, wherein the tilt mechanism is rotatable about the second horizontal axis (A6) via sliding motion of the tilt ring relative to the ring housing.

4. The support system of claim 1, wherein the tilt mechanism further includes a cradle positioned within the ring housing, the cradle configured to adjust a frictional force on the tilt ring.

5. The support system of claim 4, wherein the tilt ring is slidable within both the ring housing and the cradle, and wherein the ring housing defines a first travel path (P1) and the cradle defines a second travel path (P2).

6. The support system of claim 5, wherein the cradle is pivotally connected to the ring housing, and wherein pivoting movement of the cradle moves the second travel path (P2) relative to the first travel path (P1).

7. The support system of claim 6, wherein a frictional force on the tilt ring is increased as the second travel path (P2) is offset from the first travel path (P1).

8. The support system of claim 4, further comprising an adjustment mechanism configured to pivot the cradle relative to the ring housing to adjust the frictional force on the tilt ring.

9. The support system of claim 8, wherein the adjustment mechanism includes a rotating member and a transverse pin.

10. A support system for a display device comprising:

a first arm configured to extend from a support surface;

a second arm rotatably connected to the first arm, the second arm having a range of movement relative to the first arm;

a head joint rotatably connected to the second arm; and a tilt mechanism disposed at least partially within the head joint, the tilt mechanism including a ring housing received within the head joint, the ring housing rotatable relative to the head joint about a vertical axis (A5), and a tilt ring received within the head joint and including a mount configured to connect to a display, the tilt ring rotatably fixed to the ring housing for co-rotation about the vertical axis (A5), the tilt ring slidable relative to the ring housing for rotation about a horizontal axis (A6).

11. The support system of claim 10, wherein the tilt ring extends into an opening in the ring housing and is slidable relative within the opening to adjust a tilt of the display.

12. The support system of claim 11, wherein the rotation of the ring housing and the tilt ring about the vertical axis (A5) adjust a pan of the display.

13. The support system of claim 10, wherein the mount has a disc shape.

14. The support system of claim 13, wherein the mount is coupled to a mounting plate, and wherein one of the mount and the mounting plate includes a grove and the other of the mount and the mounting plate includes a protrusion that engages with the grove.

15. The support system of claim 10, wherein the tilt mechanism further includes a cradle pivotably connected to the ring housing, wherein pivoting the ring cradle adjusts a frictional force on the tilt ring.

16. The support system of claim 10, wherein the tilt ring has a diamond-shaped configuration that extends along an arcuate path to create friction between the tilt ring and the ring housing.

17. A support system for a display device comprising:

a first arm configured to extend from a support surface;

a second arm rotatably connected to the first arm, the second arm having a range of movement relative to the first arm;

a head joint rotatably connected to the second arm, the head joint including a joint body member; and a tilt mechanism disposed at least partially within the head joint, the tilt mechanism including a ring housing rotatably received within the head joint, a tilt ring received within the head joint and including a mount configured to connect to a display, the tilt ring extending into an opening in the ring housing and slidable relative to the ring housing to adjust a tilt of the display, and a cradle positioned within the ring housing and pivotally connected to the ring housing, wherein pivoting movement of the cradle adjusts a frictional force on the tilt ring.

* * * * *